US012229985B2

(12) United States Patent
Shrivastava et al.

(10) Patent No.: US 12,229,985 B2
(45) Date of Patent: Feb. 18, 2025

(54) VEHICLE POSE MANAGEMENT

(71) Applicant: Ford Global Technologies, LLC, Dearborn, MI (US)

(72) Inventors: Shubham Shrivastava, Santa Clara, CA (US); Bhushan Ghadge, Sunnyvale, CA (US); Punarjay Chakravarty, Campbell, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 385 days.

(21) Appl. No.: 17/818,447

(22) Filed: Aug. 9, 2022

(65) Prior Publication Data

US 2024/0054673 A1  Feb. 15, 2024

(51) Int. Cl.
*G06T 7/73* (2017.01)
*G06N 3/0464* (2023.01)
*G06T 7/269* (2017.01)
*G06V 10/25* (2022.01)
*B62D 65/02* (2006.01)

(52) U.S. Cl.
CPC .............. *G06T 7/73* (2017.01); *B62D 65/02* (2013.01); *G06T 2207/20084* (2013.01)

(58) Field of Classification Search
CPC . G06T 7/73; G06T 2207/20084; G06T 7/269; G06T 2207/10021; G06T 2207/10024; G06T 2207/10028; G06T 2207/20072; G06T 2207/20076; G06T 2207/20101; G06T 2207/20081; G06T 2207/30252; B62D 65/02; B62D 65/18; G06N 3/0464; G06N 3/08; G06V 10/25; G06V 10/82
See application file for complete search history.

(56) References Cited

U.S. PATENT DOCUMENTS

2015/0371104 A1 12/2015 Fung et al.
2019/0346271 A1 11/2019 Zhang et al.
2021/0209797 A1* 7/2021 Lee .......................... G06T 17/00
(Continued)

OTHER PUBLICATIONS

"Ray-Plane Intersection", https://www.cs.princeton.edu/courses/archive/fall00/cs426/lectures/raycast/sld017.htm(2000).
(Continued)

*Primary Examiner* — Siamak Harandi
*Assistant Examiner* — Andrew S Dudisalich
(74) *Attorney, Agent, or Firm* — Frank A. MacKenzie; Brooks Kushman P.C.

(57) ABSTRACT

A computer includes a processor and a memory, and the memory stores instructions executable by the processor to receive an image frame from a camera, the image frame showing a vehicle, determine a two-dimensional bounding box around the vehicle in the image frame, determine a first three-dimensional point that is an intersection between (a) a ray extending from the camera through a center of the two-dimensional bounding box and (b) a first plane that is parallel to a ground plane, determine a second three-dimensional point on the vehicle, and determine an orientation of the vehicle based on the first three-dimensional point, the second three-dimensional point, and the ground plane. The ground plane represents a surface on which the vehicle sits.

20 Claims, 6 Drawing Sheets

(56) References Cited

U.S. PATENT DOCUMENTS

2021/0397867 A1* 12/2021 Ge .......................... G06T 7/70
2022/0011579 A1   1/2022 Wang et al.

OTHER PUBLICATIONS

Tan, "Inverse Projection Transformation", https://towardsdatascience.com/inverse-projection-transformation-c866ccedef1c, Dec. 15, 2019.
Zhou et al., "Objects as Points", https://github.com/xingyizhou/CenterNet (2019).

* cited by examiner

VEHICLE POSE MANAGEMENT

BACKGROUND

A pose is a position and orientation of an object, e.g., a vehicle. Camera data about an object can be used to determine the object pose. A vehicle pose can depend on its environment. For example, the vehicle may be manufactured on an assembly line having a plurality of workstations. Each workstation typically adds the same part(s) or performs the same operation on each partially finished product in turn.

DETAILED DESCRIPTION

Figure 1:
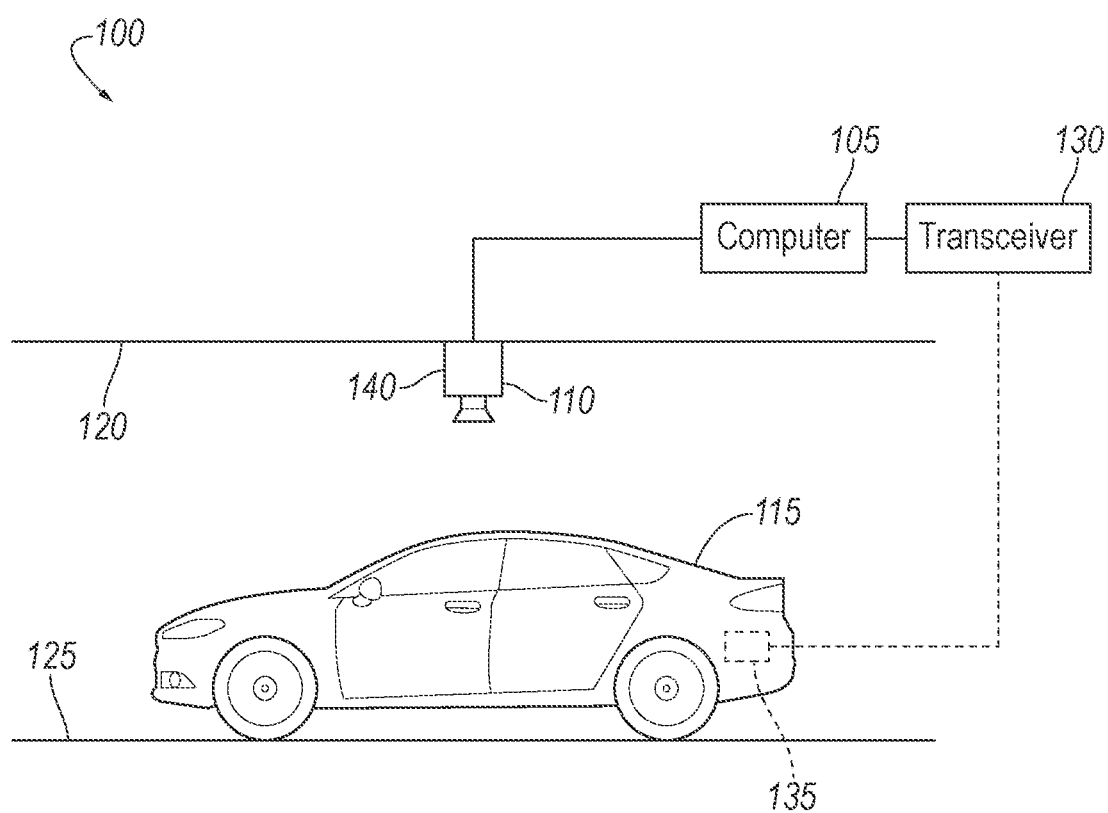
FIG. 1 is a side diagrammatic view of an example vehicle moving through an example facility.

This disclosure relates to determining a pose of a vehicle based on image data from one or more cameras that capture images of the vehicle. For example, the pose of a vehicle can be determined as the vehicle moves through an assembly line in a facility, and if the vehicle is an autonomous vehicle for which the powertrain has already been assembled, the vehicle can be commanded to move itself based on the pose. The facility can include a plurality of cameras, and the vehicle can move within view of one or more of those cameras in turn.

A computer of the facility can be programmed to receive an image frame from a camera showing the vehicle, determine a two-dimensional bounding box around the vehicle in the image frame, determine a first three-dimensional point that is an intersection between (a) a ray extending from the camera through a center of the two-dimensional bounding box and (b) a plane parallel to the ground, determine a second three-dimensional point on the vehicle, and determine an orientation of the vehicle based on the first three-dimensional point, the second three-dimensional point, and the ground plane. The plane may be at half the height of the vehicle, and the first three-dimensional point may thereby be located at a center of a three-dimensional bounding box of the vehicle, i.e., at a location halfway along the length of the vehicle, halfway across the vehicle, and half the height of the vehicle. The first three-dimensional point and the orientation can constitute the pose.

These techniques can estimate the pose in a manner that is computationally efficient, is easy to implement, and makes low hardware demands. The computer achieves computational efficiency because, after determining the two-dimensional bounding box, the computer mostly performs geometrical computations rather than more intensive machine-learning computations. The implementation of the system is easy compared to other machine-learning techniques for object detection and tracking that require extensively annotated training data, which these techniques can forego. Finally, the hardware that the computer uses for determining the pose is only a camera, not a lidar, which can be more expensive and draw more power.

A computer includes a processor and a memory, and the memory stores instructions executable by the processor to receive an image frame from a camera, the image frame showing a vehicle; determine a two-dimensional bounding box around the vehicle in the image frame; determine a first three-dimensional point that is an intersection between (a) a ray extending from the camera through a center of the two-dimensional bounding box and (b) a first plane that is parallel to a ground plane, the ground plane representing a surface on which the vehicle sits; determine a second three-dimensional point on the vehicle; and determine an orientation of the vehicle based on the first three-dimensional point, the second three-dimensional point, and the ground plane.

The instructions may further include instructions to transmit a message to the vehicle for actuating the vehicle based on the first three-dimensional point and the orientation.

A distance between the first plane and the ground plane may be half of a height of the vehicle.

Determining the second three-dimensional point may include identifying a landmark of the vehicle in the image frame and determining the second three-dimensional point corresponding to the landmark. The ray may be a first ray, the intersection may be a first intersection, and determining the second three-dimensional point may include determining a second intersection between (a) a second ray extending from the camera through the landmark and (b) the first plane.

Identifying the landmark may include receiving an input designating the landmark.

The orientation may include a vehicle roll, a vehicle pitch, and a vehicle yaw, and determining the orientation may include setting the vehicle roll equal to a ground-plane roll of the ground plane and setting the vehicle pitch equal to a ground-plane pitch of the ground plane. Determining the orientation may include determining the vehicle yaw based on a direction from the first three-dimensional point to the second three-dimensional point.

Determining the two-dimensional bounding box may include executing a neural network.

The ground plane may be preset in the memory.

The instructions may further include instructions to determine the ground plane based on range data received from a depth sensor. The range data may be generated by the depth sensor when the vehicle is absent. Determining the ground plane may include fitting a plane to the range data.

Determining the first three-dimensional point and determining the second three-dimensional point may be performed repeatedly, each repetition for one of a plurality of image frames. Determining the first three-dimensional point and determining the second three-dimensional point may include minimizing an error across the repetitions. The error may include a reprojection error between pixel coordinates of the first three-dimensional point and the second three-dimensional point and reprojections of the first three-dimensional point and the second three-dimensional point to pixel coordinates.

Determining the first three-dimensional point and determining the second three-dimensional point may include performing factor-graph optimization of the first three-dimensional point and the second three-dimensional point.

Determining the second three-dimensional point may include identifying a landmark of the vehicle in a first of the image frames, determining the second three-dimensional point corresponding to the landmark, and tracking the landmark over the repetitions. Tracking the landmark over the repetitions may be based on optical flow.

A method includes receiving an image frame from a camera, the image frame showing a vehicle; determining a two-dimensional bounding box around the vehicle in the image frame; determining a first three-dimensional point that is an intersection between (a) a ray extending from the camera through a center of the two-dimensional bounding box and (b) a first plane that is parallel to a ground plane, the ground plane representing a surface on which the vehicle sits; determining a second three-dimensional point on the vehicle; and determining an orientation of the vehicle based on the first three-dimensional point, the second three-dimensional point, and the ground plane.

With reference to the Figures, wherein like numerals indicate like parts throughout the several views, a computer 105 includes a processor and a memory, and the memory stores instructions executable by the processor to receive an image frame 200 from a camera 110, the image frame 200 showing a vehicle 115; determine a two-dimensional bounding box 205 around the vehicle 115 in the image frame 200; determine a first three-dimensional point 210 that is a first intersection between (a) a first ray 215 extending from the camera 110 through a center of the two-dimensional bounding box 205 and (b) a first plane 220 that is parallel to a ground plane 225; determine a second three-dimensional point 310 on the vehicle 115; and determine an orientation of the vehicle 115 based on the first three-dimensional point 210, the second three-dimensional point 310, and the ground plane 225. The ground plane 225 represents a surface 125 on which the vehicle 115 sits.

With reference to FIG. 1, the vehicle 115 may be any passenger or commercial automobile such as a car, a truck, a sport utility vehicle, a crossover, a van, a minivan, a taxi, a bus, etc.

The vehicle 115 may be an autonomous vehicle. A vehicle computer 135 can be programmed to operate the vehicle 115 independently of the intervention of a human operator, completely or to a lesser degree. The vehicle computer 135 may be programmed to operate a propulsion system, a brake system, a steering system, and/or other vehicle systems. For the purposes of this disclosure, autonomous operation means the vehicle computer 135 controls the propulsion system, brake system, and steering system without input from a human operator; semi-autonomous operation means the vehicle computer 135 controls one or two of the propulsion system, brake system, and steering system and a human operator controls the remainder; and nonautonomous operation means a human operator controls the propulsion system, brake system, and steering system.

The vehicle computer 135 is a microprocessor-based computing device, e.g., a generic computing device including a processor and a memory, an electronic controller or the like, a field-programmable gate array (FPGA), an application-specific integrated circuit (ASIC), a combination of the foregoing, etc. Typically, a hardware description language such as VHDL (VHSIC (Very High Speed Integrated Circuit) Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g., stored in a memory electrically connected to the FPGA circuit. The vehicle computer 135 can thus include a processor, a memory, etc. The memory of the vehicle computer 135 can include media for storing instructions executable by the processor as well as for electronically storing data and/or databases, and/or the vehicle computer 135 can include structures such as the foregoing by which programming is provided. The vehicle computer 135 can be multiple computers coupled together.

The vehicle 115 can be in a facility 100. The facility 100 can be a structure, e.g., a building or a series of buildings, at which the vehicle 115 is manufactured, assembled, operated on, repaired, upgraded, etc. The facility 100 can include a ceiling 120 positioned above the vehicle 115 and a surface 125, i.e., a floor, on which the vehicle 115 can sit and travel.

The facility 100 can include the computer 105. The computer 105 is a microprocessor-based computing device, e.g., a generic computing device including a processor and a memory. The memory of the computer 105 can include media for storing instructions executable by the processor as well as for electronically storing data and/or databases, and/or the computer 105 can include structures such as the foregoing by which programming is provided. The computer 105 can be multiple computers coupled together.

The facility 100 includes at least one camera 110, e.g., a plurality of the cameras 110, communicatively coupled to the computer 105. The camera 110 can detect electromagnetic radiation in some range of wavelengths. For example, the camera 110 may detect visible light, infrared radiation, ultraviolet light, or some range of wavelengths including visible, infrared, and/or ultraviolet light. For example, the camera 110 can be a charge-coupled device (CCD), complementary metal oxide semiconductor (CMOS), or any other suitable type.

The camera 110 can be positioned above the vehicle 115 and oriented facing downward, either diagonally downward or straight downward (i.e., and axis of the camera lens may be non-perpendicular or perpendicular to a horizontal plane). For example, the camera 110 can be mounted to the ceiling 120 of the facility 100. A center of the field of view of each camera 110 can be a vertical line downward to the surface 125 of the facility 100. If there are multiple cameras 110, the cameras 110 can be arranged to have overlapping fields of view, such that the vehicle 115 can be within the fields of view of multiple cameras 110 at once. The cameras 110 can be arranged to provide coverage of the surface 125 of the facility 100, or of at least a portion of the surface 125 on which the vehicle 115 can travel.

The facility 100 may include a depth sensor 140. The depth sensor 140 can detect range data, i.e., data indicating distances from the depth sensor 140 to points in the environment, e.g., a depth map. The depth sensor 140 may be included with the camera 110, e.g., the camera 110 may be an RGB-D camera such as a time-of-flight camera, a passive stereo camera, an active stereo camera, a structured-light camera, etc.

The facility 100 can include a transceiver 130 communicatively coupled to the computer 105. The transceiver 130 may be adapted to transmit signals wirelessly through any suitable wireless communication protocol, such as cellular, Bluetooth®, Bluetooth® Low Energy (BLE), ultra-wideband (UWB), WiFi, IEEE 802.11a/b/g/p, cellular-V2X (CV2X), Dedicated Short-Range Communications (DSRC), other RF (radio frequency) communications, etc. The transceiver 130 may be adapted to communicate with a remote computer, that is, a computer distinct and spaced from the transceiver 130, e.g., distinct from the facility 100. For example, the remote computer can be the vehicle 115, e.g., the vehicle computer 135 of the vehicle 115. The transceiver 130 may be one device or may include a separate transmitter and receiver.

Figure 2:
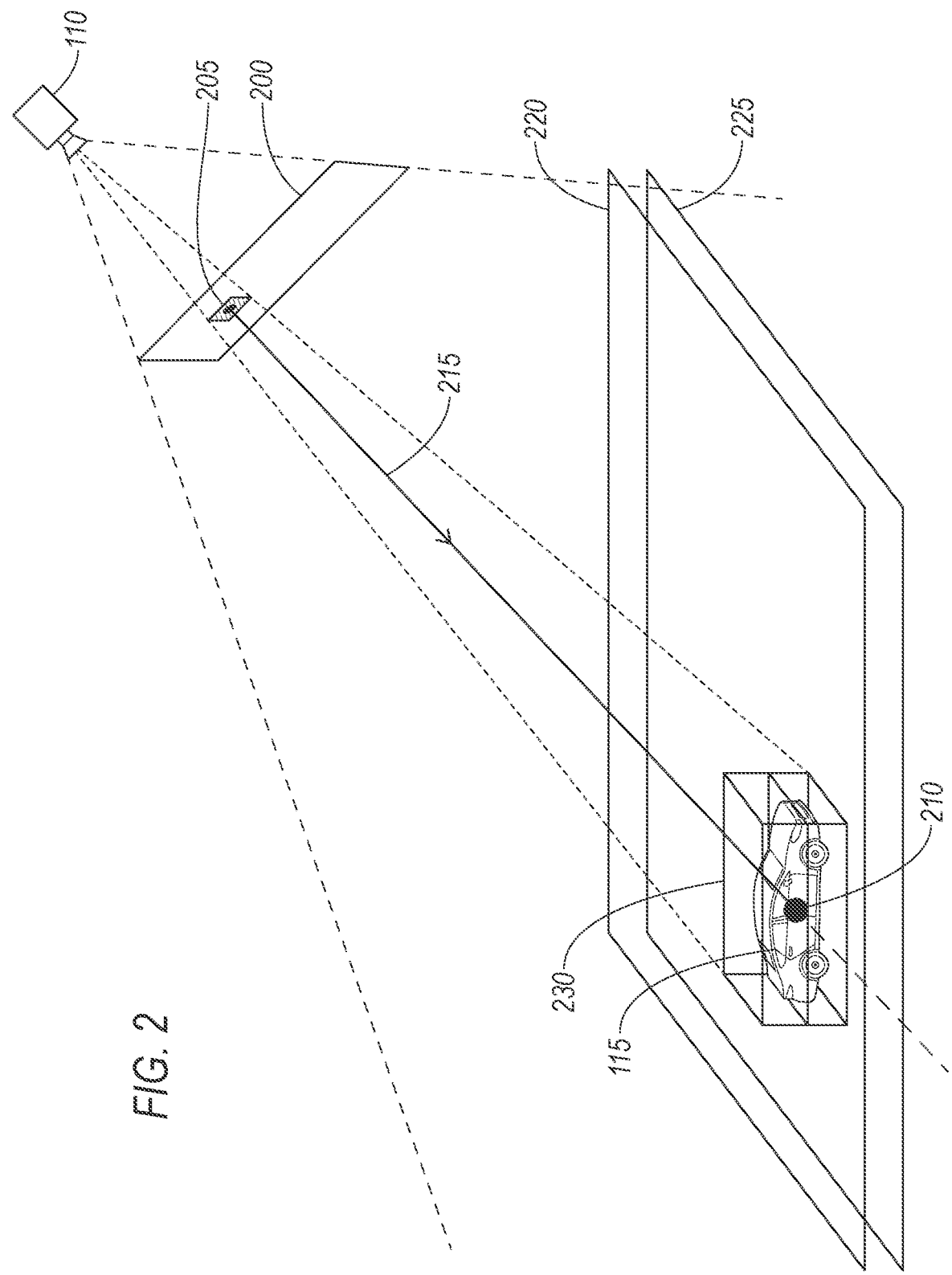
FIG. 2 is a diagram of the vehicle within a field of view of a camera of the facility.

With reference to FIG. 2, the computer 105 can receive image data from the camera 110. The image data are sequences of the image frames 200 of the field of view of the camera 110. Each image frame 200 is a two-dimensional matrix of pixels. Each pixel has a brightness or color represented as one or more numerical values, e.g., a scalar unitless value of photometric light intensity between 0 (black) and 1 (white), or values for each of red, green, and blue, e.g., each on an 8-bit scale (0 to 255) or a 12- or 16-bit scale. The pixels may be a mix of representations, e.g., a repeating pattern of scalar values of intensity for three pixels and a fourth pixel with three numerical color values, or some other pattern. Position in an image frame 200 can be specified in pixel coordinates, e.g., an ordered pair of pixel distances, such as a number of pixels from a top edge and a number of pixels from a left edge of the image frame 200. The image frames 200 can show the vehicle 115, fully or partially.

The techniques described below rely on the ground plane 225. The ground plane 225 represents the surface 125 on which the vehicle 115 sits. The surface 125, and thereby the ground plane 225, may be, e.g., horizontal or sloped. The ground plane 225 may be formulated as a three-dimensional equation, e.g., a linear three-dimensional equation: $ax+by+cz+d=0$. The equation may be in a Cartesian coordinate system of a reference frame of the camera 110. For example, if the camera 110 is installed in a fixed location and calibrated, then the ground plane 225 may be preset in memory, e.g., based on being measured relative to the camera 110. For another example, the computer 105 may be programmed to determine the ground plane 225 based on range data received from the depth sensor 140. The range data may be generated by the depth sensor 140 when the vehicle 115 is absent, i.e., the computer 105 may determine the ground plane 225 in response to the vehicle 115 being absent, thereby providing a full view of the surface 125. Determining the ground plane 225 may include fitting a plane to the range data using any suitable technique, e.g., random sample consensus (RANSAC).

The first plane 220 is defined relative to the ground plane 225. The first plane 220 is parallel to the ground plane 225. The first plane 220 is a preset distance above the ground plane 225; i.e., the ground plane 225 and the first plane 220 are offset by the preset distance. The preset distance can be chosen to put a center of the vehicle 115 in the first plane 220. For example, the preset distance can be half a height of the vehicle 115, meaning that the first plane 220 bisects a three-dimensional bounding box 230 around the vehicle 115. The first plane 220 can be represented by as a three-dimensional equation, e.g., a linear three-dimensional equation: $ax+by+cz+(d-h/2)=0$. The computer 105 may determine the first plane 220 from the ground plane 225, e.g., by applying the offset.

The computer 105 is programmed to determine the two-dimensional bounding box 205 around the vehicle 115 in the image frame 200. The two-dimensional bounding box 205 may be a minimally sized rectangle that encompasses an entirety of the vehicle 115 in the image frame 200. For example, determining the two-dimensional bounding box 205 may include executing a neural network, e.g., a deep neural network trained for object detection such as CenterNet.

The computer 105 is programmed to determine the first ray 215. The first ray 215 extends from the camera 110 through a center of the two-dimensional bounding box 205. For the purposes of this disclosure, the term "ray" is used in its geometric sense of a portion of a line with a fixed starting point extending in a direction. Here, the first ray 215 extends from the camera 110, e.g., the focal point of the camera 110, in a direction defined by passing through a center of the two-dimensional bounding box 205 in an image plane of the camera 110. For example, the first ray 215 can be represented by a unit vector $l_1$. The unit vector $l_1$ can be given by, e.g., the matrix product of an inverse of an intrinsic matrix of the camera 110 and a vector of the pixel coordinates of the center of the two-dimensional bounding box 205, divided by the magnitude of that matrix product, i.e.:

$$l_1 = \frac{K^{-1}p_1}{\|K^{-1}p_1\|}$$

in which K is the intrinsic matrix of the camera 110 and $p_1$ is the center of the two-dimensional bounding box 205 in pixel coordinates, i.e., $p_1=(x, y, 1)$. The intrinsic matrix K of the camera 110 is known from calibration of the camera 110 and may be provided by a manufacturer of the camera 110.

The computer 105 is programmed to determine the first three-dimensional point 210 that is an intersection between the first ray 215 and the first plane 220. For example, the first three-dimensional point 210 may be a sum of an origin point of the first ray 215 and product of a scaling factor and the unit vector $l_1$ of the first ray 215, i.e., $P_1=P_0+t_1 l_1$, in which $P_1$ is the first three-dimensional point 210, $P_0$ is the origin point of the ray, and $t_1$ is the scaling factor. The origin point of the first ray 215 can be the origin of the reference frame of the camera 110, meaning that $P_0=(0, 0, 0)$. The scaling factor $t_1$ can be based on the origin point of the first ray 215, the unit vector of the first ray 215, and the first plane 220. For example, the scaling factor can be given by the following equation:

$$t_1 = -\frac{P_0 \cdot N + d - h/2}{l_1 \cdot N}$$

in which N is a normal vector to the first plane 220 (or equivalently to the ground plane 225), d is the constant from the equation for the ground plane 225 from above, and h is the height of the vehicle 115. The normal vector N can be represented by as the sum of the products of the coefficients of the equation of the first plane 220 (and ground plane 225) and the respective Cartesian unit vectors:

$$N=a\hat{i}+b\hat{j}+c\hat{k}$$

in which a, b, and c are the coefficients of the equation of the first plane 220, and $\hat{i}$, $\hat{j}$, and $\hat{k}$ are the Cartesian unit vectors.

Figure 3:
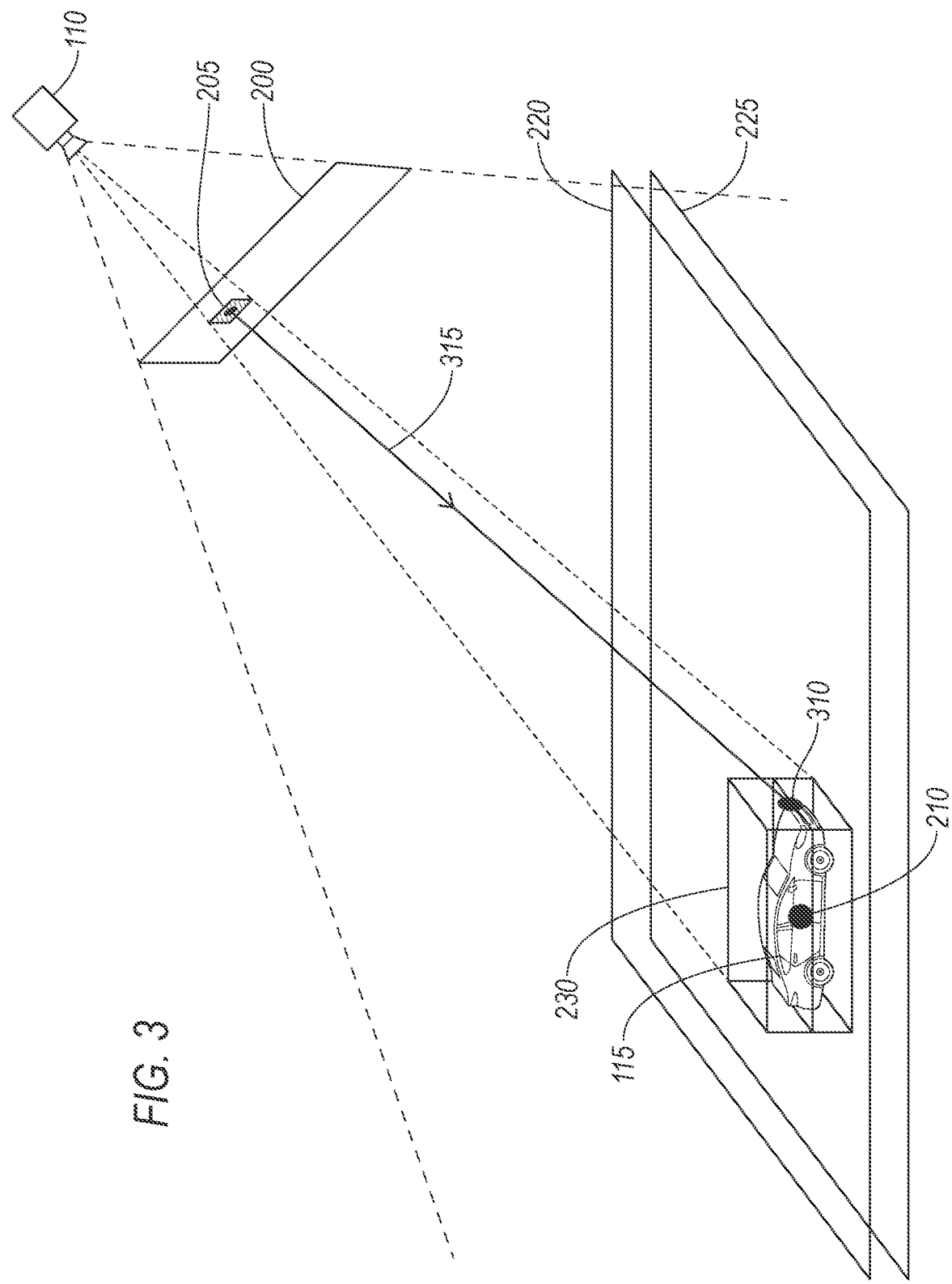
FIG. 3 is another diagram of the vehicle within the field of view of the camera.

With reference to FIG. 3, the computer 105 is programmed to determine the second three-dimensional point 310, as will be described below. The second three-dimensional point 310 can correspond to a landmark of the vehicle 115. For the purposes of this disclosure, a "landmark" is defined as a recognizable feature of something. The landmark can be a point defined by edge(s) and/or corner(s) of components of the vehicle 115. For example, the landmark can be a point on a front end, e.g., a grill, of the vehicle 115. The landmark can be chosen to be visible to the camera 110 and to be located at approximately half the height of the vehicle 115, i.e., in the first plane 220.

The computer 105 may be programmed to identify the landmark. For example, the computer 105 may receive an input designating the landmark. A user may view the image frame 200 and click on a pixel of the image frame 200, and the computer 105 may designate the corresponding location on the vehicle 115 as the landmark. For another example, the computer 105 may execute a machine-learning program. The machine-learning program can be any suitable type for receiving image data as input and generating a classification as output, e.g., a neural network such as a convolutional neural network. The classification can be the qualitative location of the landmark on the vehicle 115, e.g., center of the grill. A convolutional neural network includes a series of layers, with each layer using the previous layer as input. Each layer contains a plurality of neurons that receive as input data generated by a subset of the neurons of the previous layers and generate output that is sent to neurons in the next layer. Types of layers include convolutional layers, which compute a dot product of a weight and a small region of input data; pool layers, which perform a downsampling operation along spatial dimensions; and fully connected layers, which generate based on the output of all neurons of the previous layer. The final layer of the convolutional neural network generates a score for each potential classification, and the final output is the classification with the highest score. The machine-learning program can be trained on a dataset of image frames with the landmarks selected and coded manually by a technician. The manual coding of the landmarks serves as ground truth that the machine-learning program is trained to replicate.

The computer 105 may be programmed to determine a second ray 315. The second ray 315 extends from the camera 110 through the landmark in the two-dimensional bounding box 205. The second ray 315 extends from the camera 110, e.g., the focal point of the camera 110, in a direction defined by passing through the landmark in the image plane of the camera 110. For example, the second ray 315 can be represented by a unit vector $l_2$. The unit vector $l_2$ can be given by, e.g., the matrix product of an inverse of an intrinsic matrix of the camera 110 and a vector of the pixel coordinates of the landmark, divided by the magnitude of that matrix product, i.e.:

$$l_2 = \frac{K^{-1}p_2}{\|K^{-1}p_2\|}$$

in which K is the intrinsic matrix of the camera 110 and $p_2$ is the landmark in pixel coordinates, i.e., $p_2=(x, y, 1)$.

The computer 105 is programmed to determine the second three-dimensional point 310. The second three-dimensional point 310 may be an intersection between the second ray 315 and the first plane 220. For example, the computer 105 may determine the second three-dimensional point 310 in the same manner as determining the first three-dimensional point 210 described above, with the unit vector $l_2$ of the second ray 315 substituted for the unit vector $l_1$ of the first ray 215.

The computer 105 is programmed to determine the orientation of the vehicle 115 based on the first three-dimensional point 210, the second three-dimensional point 310, and the ground plane 225. The orientation includes vehicle yaw $\psi$, vehicle roll $\varphi$, and vehicle pitch $\theta$. The vehicle yaw $\psi$ can be an angular dimension about the z-axis, the vehicle roll $\varphi$ can be an angular dimension about the x-axis, and the vehicle pitch $\theta$ can be an angular dimension about the y-axis. For example, the computer 105 can set the vehicle roll $\varphi$ equal to a ground-plane roll of the ground plane 225 and set the vehicle pitch $\theta$ equal to a ground-plane pitch of the ground plane 225. The computer 105 may determine the vehicle yaw $\psi$ based on a direction from the first three-dimensional point 210 to the second three-dimensional point 310. If the second three-dimensional point 310 is centered laterally on the vehicle 115, then the vehicle yaw $\psi$ is an angle in the x-y plane between the x-axis and a vector from the first three-dimensional point 210 to the second three-dimensional point 310. If the second three-dimensional point 310 is located elsewhere on the vehicle 115, the vehicle yaw $\psi$ can be determined in the same manner with an adjustment based on a known geometry of the vehicle 115.

The first three-dimensional point 210 and the orientation may together constitute the pose of the vehicle 115. For the purposes of this disclosure, a pose is defined as a description of the position and/or orientation of something, e.g., the vehicle 115. The pose can be represented as a vector of values for dimensions of the position and/or the orientation of the vehicle 115. Dimensions of the position can include two horizontal spatial dimensions x, y and a vertical spatial dimension z. Dimensions of the orientation can include yaw $\psi$, roll $\varphi$, and pitch $\theta$. The yaw $\psi$ can be an angular dimension about the z-axis, the roll $\varphi$ can be an angular dimension about the x-axis, and the pitch $\theta$ can be an angular dimension about the y-axis. The pose can alternatively and equivalently be represented as a transformation matrix that transforms from the reference frame of the vehicle 115 to a reference frame of the facility 100, e.g., of one of the cameras 110. The transformation matrix can be a 3×4 matrix that includes a 3×3 rotation matrix R and a 3×1 translation vector T, i.e., [R|T].

The steps described above for determining the first three-dimensional point 210 and determining the second three-dimensional point 310 may be performed repeatedly. For example, the steps may be performed once for each image frame 200; i.e., each repetition is for one of a plurality of the image frames 200. The computer 105 can thus track the vehicle 115 as the vehicle 115 moves through the facility 100.

The computer 105 may be programmed to track the landmark over the repetitions, i.e., across successive image frames 200. For example, tracking the landmark may be based on optical flow. The optical flow describes a scene shift, i.e., differences in pixel coordinates corresponding to respective points in space, between an earlier image frame 200 taken as input and a later image frame 200. The later image frame 200 can be from a different, nearby point in time from the earlier image frame 200. For example, for the landmark observed in the earlier and later image frames 200, the optical flow gives a mapping from the pixel coordinates in the earlier image frame 200 to the pixel coordinates in the later image frame 200, e.g., Flow$((i_1, j_1))\rightarrow(i_2, j_2)$. The optical flow can be determined using known image-processing techniques for scene flow for images. The pixel coordinates in the later image frame 200 can be used as the location $p_2$ of the landmark for the purposes of determining the second three-dimensional point 310 as described above.

Figure 4:
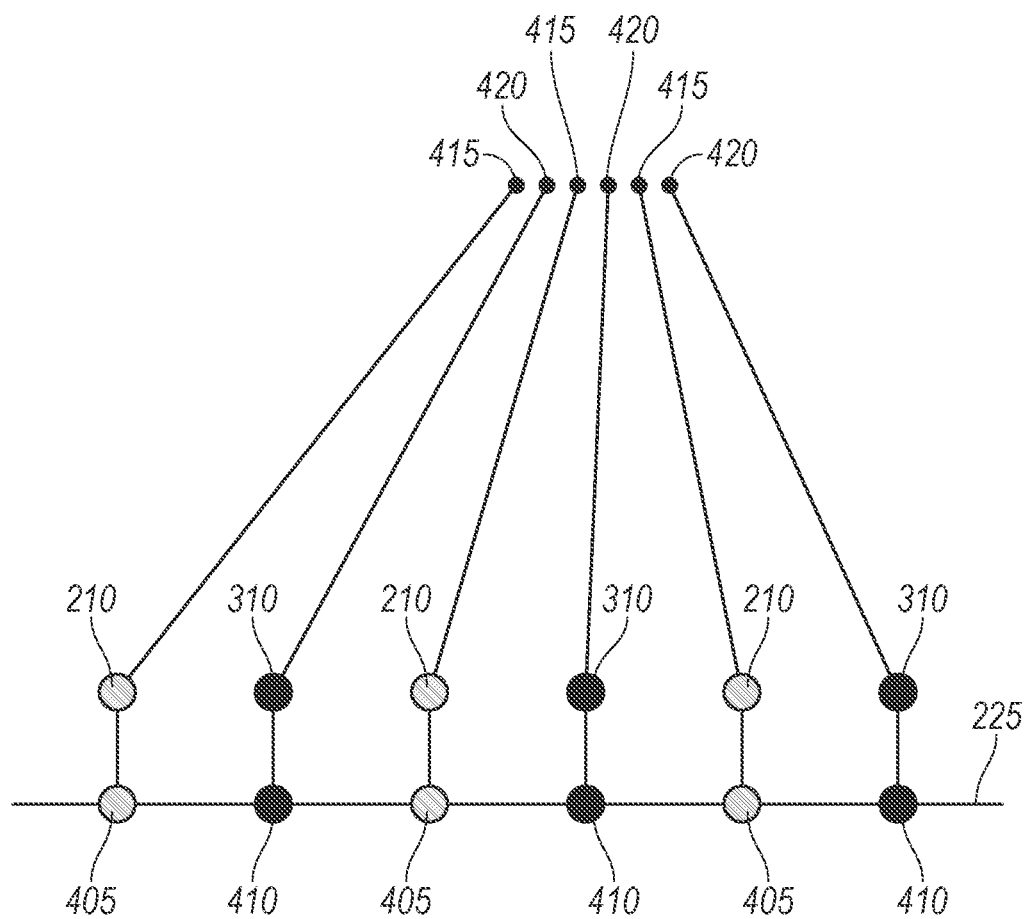
FIG. 4 is a diagram of points of the vehicle tracked over time.

With reference to FIG. 4, the computer 105 may be programmed to model the successive first three-dimensional points 210 and second three-dimensional points 310 as a factor graph. A factor graph is a bipartite graph representing the factorization of a function of a set of arguments into a plurality of factors. The factors are each a function of a subset of the arguments. Each edge of the factor graph connects one function and one argument of that function. In this case, the factors may include a projection from the first three-dimensional point 210 or the second three-dimensional point 310 to the image plane, resulting in a first image-plane point 415 (for the first three-dimensional point 210) or a second image-plane point 420 (for the second three-dimensional point 310). The factors may also include a planar constraint between a first projection 405 of the first three-dimensional point 210 to the ground plane 225 and a second projection 410 of the second three-dimensional point 310 to the ground plane 225 in a given repetition, as well as between the second projection 410 of a repetition and the first projection 405 of the next repetition. The planar constraint is that the projections are in the same plane.

The computer 105 may be programmed to determine a planar error from the first projections 405 and second projections 410, according to the factor graph. For example, the computer 105 may fit a plane to the first projections 405 and the second projections 410. The ground plane 225 may be used as an initial guess for the fitted plane. For example, the computer 105 may minimize the following error:

$$E_{planar} = \sum_{i=1}^{n}(ax_i + by_i + cz_i + d)$$

in which i is an index for the first projections 405 and the second projections 410.

The computer 105 may be programmed to determine a reprojection error between the pixel coordinate of the first three-dimensional point 210 (i.e., the center of the two-dimensional bounding box 205) and a reprojection of the first three-dimensional point 210 to pixel coordinates, and a reprojection error between the pixel coordinate of the second three-dimensional point 310 (i.e., of the landmark) and a reprojection of the second three-dimensional point 310 to pixel coordinates, according to the factor graph. The computer 105 may reproject the first three-dimensional point 210 or the second three-dimensional point 310 to pixel coordinates as a matrix product of the intrinsic matrix of the camera 110, the pose of the vehicle 115 with respect to the camera 110, and the vector of the first three-dimensional point 210 or second three-dimensional point 310, e.g., the following equation:

$$x = K[R|T]X$$

in which K is the intrinsic matrix of the camera 110; [R|T] is the pose of the vehicle 115 with respect to the camera 110, e.g., represented as a transformation matrix from the reference frame of the vehicle 115 to the reference frame of the camera 110; and X is the vector of the first three-dimensional point 210 or second three-dimensional point 310. The transformation matrix [R|T] representing the pose may be known from the first three-dimensional point 210 and the orientation according to known geometric conversions. The reprojection error may be calculated as a sum of the squared differences between the pixel coordinates detected in the image frame 200 (i.e., the center of the two-dimensional bounding box 205 for the first three-dimensional point 210 or the landmark for the second three-dimensional point 310) and pixel coordinates from the reprojections of the first three-dimensional point 210 or second three-dimensional point 310, e.g., the following equation:

$$E_{reproj} = \sum_{i=1}^{n}(u_i - p_i)^2 + (v_i - q_i)^2$$

in which i is an index of the first three-dimensional points 210 and second three-dimensional points 310, $(u_i, v_i)$ is the pixel coordinates of the center of the two-dimensional bounding box 205 or the landmark, and $(p_i, q_i)$ is the pixel coordinates from reprojecting the first three-dimensional point 210 or second three-dimensional point 310.

The computer 105 may be programmed to perform factor-graph optimization of the first three-dimensional point 210 and the second three-dimensional point 310. For example, the computer 105 can adjust the values of the first three-dimensional point 210 and the second three-dimensional point 310 to minimize an error across the repetitions, e.g., the planar error and/or the reprojection error as just described. The computer 105 can use any suitable optimization technique for minimizing the error, e.g., Levenberg-Marquardt or incremental Smoothing and Mapping (iSAM2).

Figure 5:
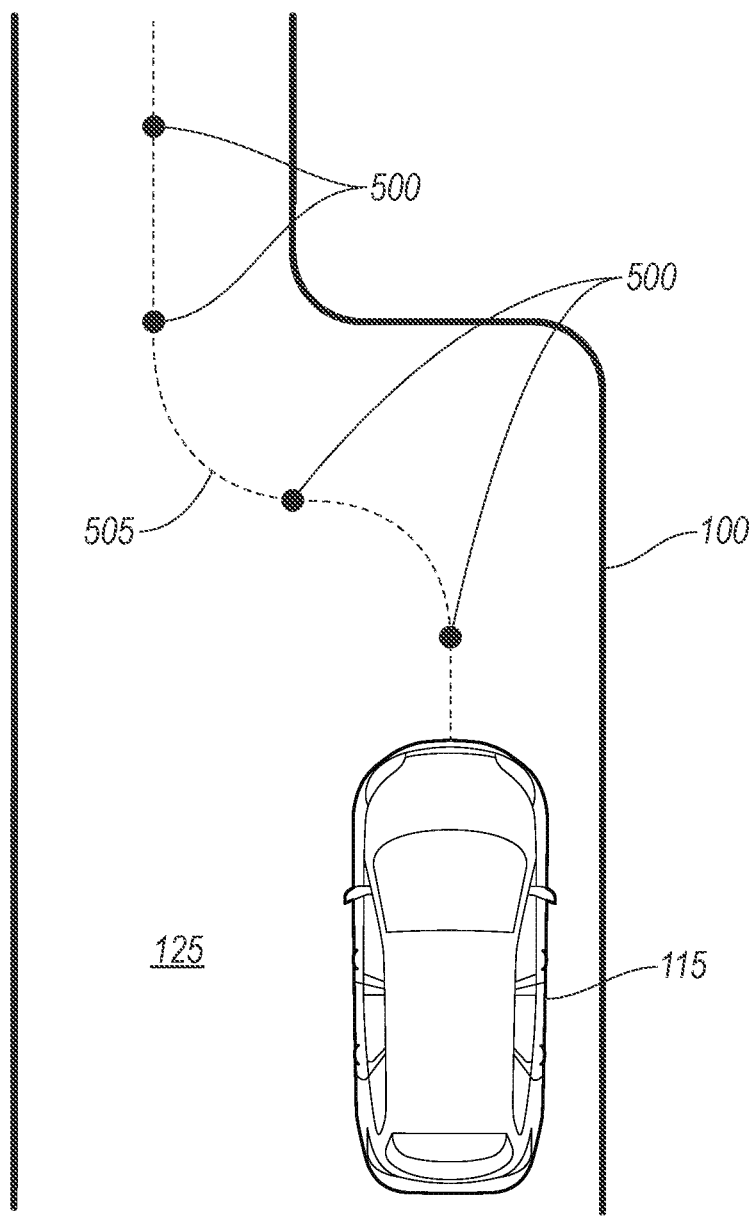
FIG. 5 is a top view of an example path that the vehicle follows through the facility.

With reference to FIG. 5, the computer 105 can determine a message and transmit the message to the vehicle 115 based on the pose, i.e., the first three-dimensional point 210 and the orientation. The computer 105 can transmit the message via the transceiver 130. The message can be usable by the vehicle 115 for actuating the vehicle 115. For example, the computer 105 can determine at least one waypoint 500, e.g., a plurality of waypoints 500 defining a path 505, based on the pose, and the message can include the at least one waypoint 500. The computer 105 can determine the waypoints 500 based on the pose of the vehicle 115, a planned destination for the vehicle 115, a three-dimensional model of the vehicle 115, and a two-dimensional or three-dimensional model of the facility 100. For example, the computer 105 can choose the waypoints 500 so that the vehicle 115 will travel along the path 505 to the planned destination such that the three-dimensional model of the vehicle 115 does not intersect the model of the facility 100 anywhere along the path 505, e.g., using known path-planning algorithms. For another example, the message can include the pose, the planned destination, and the two-dimensional or three-dimensional model of the facility 100.

Once the vehicle 115 receives the message, the vehicle 115 can autonomously navigate itself along the path 505 through the waypoints 500. For example, the vehicle computer 135 can be programmed to actuate the vehicle 115 to travel along the path 505 through the waypoints 500, e.g., to actuate the propulsion system, the brake system, and the steering system to navigate the vehicle 115 to each waypoint 500 in turn. The vehicle computer 135 can use algorithms for local path-planning, as are known, to navigate between each pair of consecutive waypoints 500. For another example, if the message includes the pose, the planned destination, and the model of the facility 100, the vehicle computer 135 can be programmed to determine the waypoints 500 and/or the path 505 so that the vehicle 115 will travel along the path 505 to the planned destination and the vehicle 115 will not intersect the facility 100 anywhere along the path 505. The vehicle computer 135 can use known global path-planning algorithms. The vehicle computer 135 can determine the possible intersections to avoid based on the model of the facility 100 and the pose specifying the position and orientation of the vehicle 115 relative to the model of the facility 100. The vehicle computer 135 can then actuate the propulsion system, the brake system, and the steering system to navigate the vehicle 115 along the path 505.

Alternatively or additionally to transmitting the message, the computer 105 can be programmed to instruct a component of the facility 100 to actuate based on the pose. For example, the computer 105 can instruct a siren or other warning device to actuate if the vehicle 115 is less than a threshold distance from a predesignated area of the facility 100, e.g., a wall or a walkway. The computer 105 can determine whether the vehicle 115 is less than the threshold distance from the predesignated area based on the pose, the three-dimensional model of the vehicle 115, and the model of the facility 100.

Figure 6:
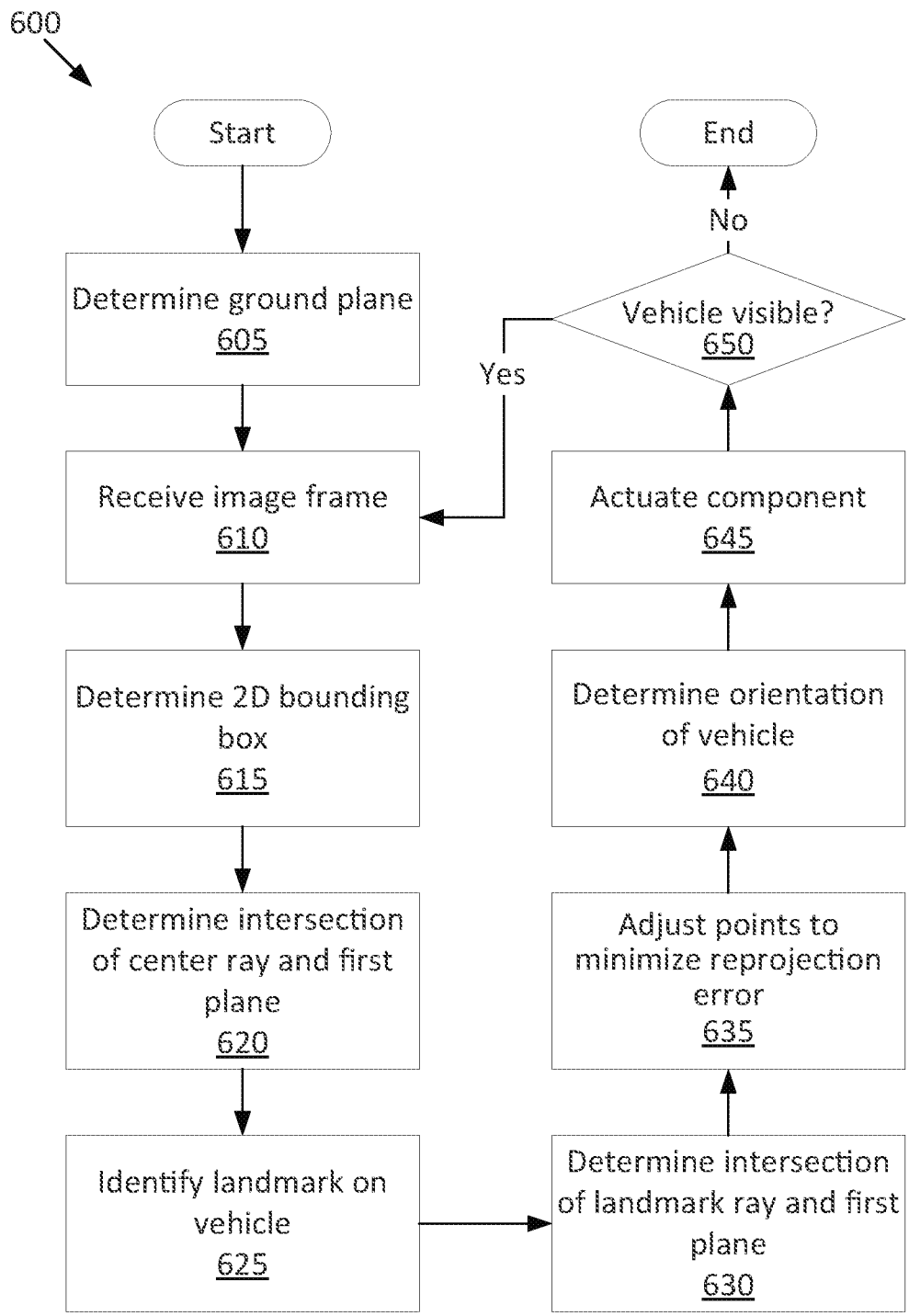
FIG. 6 is a process flow diagram of an example process for determining a pose of the vehicle.

FIG. 6 is a process flow diagram illustrating an example process 600 for determining the pose of the vehicle 115. The memory of the computer 105 stores executable instructions for performing the steps of the process 600 and/or programming can be implemented in structures such as mentioned above. As a general overview of the process 600, the computer 105 determines the ground plane 225. Then, repeatedly for as long as the vehicle 115 is visible to the camera 110, the computer 105 receives the image frame 200, determines the two-dimensional bounding box 205 around the vehicle 115 in the image frame 200, determines the first three-dimensional point 210, identifies the landmark on the vehicle 115, determines the second three-dimensional point 310, determines the orientation of the vehicle 115, adjusts the points to minimize error, and actuates a component based on the first three-dimensional point 210 and the orientation.

The process 600 begins in a block 605, in which the computer 105 determines the ground plane 225, as described above.

Next, in a block 610, the computer 105 receives the image frame 200 from the camera 110, as described above.

Next, in a block 615, the computer 105 determines the two-dimensional bounding box 205 around the vehicle 115 in the image frame 200, as described above.

Next, in a block 620, the computer 105 determines the first three-dimensional point 210, as described above.

Next, in a block 625, the computer 105 identifies the landmark of the vehicle 115 in the image frame 200, as described above.

Next, in a block 630, the computer 105 determines the second three-dimensional point 310 corresponding to the landmark, as described above.

Next, in a block 635, the computer 105 adjusts the first three-dimensional point 210 and the second three-dimensional point 310 to minimize an error, as described above.

Next, in a block 640, the computer 105 determines the orientation of the vehicle 115 based on the first three-dimensional point 210, the second three-dimensional point 310, and the ground plane 225, as described above.

Next, in a block 645, the computer 105 transmits the message to the vehicle 115 so that the vehicle 115 can use the message for actuating the vehicle 115 to travel through the facility 100, as described above. Alternatively or additionally, the computer 105 can instruct a component of the facility 100 to actuate based on the pose, as described above.

Next, in a decision block 650, the computer 105 determines whether the vehicle 115 is still visible in the image frame 200. For example, the computer 105 may execute the neural network described above for determining the two-dimensional bounding box 205. If the two-dimensional bounding box 205 is generated, then the vehicle 115 is visible; otherwise, the vehicle 115 is not visible. Upon determining that the vehicle 115 is still visible, the process 600 returns to the block 610 to perform the next repetition. Upon determining that the vehicle 115 is not visible, the process 600 ends.

In general, the computing systems and/or devices described may employ any of a number of computer operating systems, including, but by no means limited to, versions and/or varieties of the Ford Sync® application, App-Link/Smart Device Link middleware, the Microsoft Automotive® operating system, the Microsoft Windows® operating system, the Unix operating system (e.g., the Solaris® operating system distributed by Oracle Corporation of Redwood Shores, California), the AIX UNIX operating system distributed by International Business Machines of Armonk, New York, the Linux operating system, the Mac OSX and iOS operating systems distributed by Apple Inc. of Cupertino, California, the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Python, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Instructions may be transmitted by one or more transmission media, including fiber optics, wires, wireless communication, including the internals that comprise a system bus coupled to a processor of a computer. Common forms of computer-readable media include, for example, RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), a nonrelational database (NoSQL), a graph database (GDB), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In the drawings, the same reference numbers indicate the same elements. Further, some or all of these elements could be changed. With regard to the media, processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary. The adjectives "first" and "second" are used throughout this document as identifiers and are not intended to signify importance, order, or quantity. Use of "in response to" and "upon determining" indicates a causal relationship, not merely a temporal relationship.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A computer comprising a processor and a memory, the memory storing instructions executable by the processor to:
    receive an image frame from a camera, the image frame showing a vehicle;
    determine a two-dimensional bounding box around the vehicle in the image frame;
    determine a first three-dimensional point that is an intersection between (a) a ray extending from the camera through a center of the two-dimensional bounding box and (b) a first plane that is parallel to a ground plane, the ground plane representing a surface on which the vehicle sits;
    determine a second three-dimensional point on the vehicle; and
    determine an orientation of the vehicle based on the first three-dimensional point, the second three-dimensional point, and the ground plane.

2. The computer of claim 1, wherein the instructions further include instructions to transmit a message to the vehicle for actuating the vehicle based on the first three-dimensional point and the orientation.

3. The computer of claim 1, wherein a distance between the first plane and the ground plane is half of a height of the vehicle.

4. The computer of claim 1, wherein determining the second three-dimensional point includes identifying a landmark of the vehicle in the image frame and determining the second three-dimensional point corresponding to the landmark.

5. The computer of claim 4, wherein the ray is a first ray, the intersection is a first intersection, and determining the second three-dimensional point includes determining a second intersection between (a) a second ray extending from the camera through the landmark and (b) the first plane.

6. The computer of claim 4, wherein identifying the landmark includes receiving an input designating the landmark.

7. The computer of claim 1, wherein the orientation includes a vehicle roll, a vehicle pitch, and a vehicle yaw, and determining the orientation includes setting the vehicle roll equal to a ground-plane roll of the ground plane and setting the vehicle pitch equal to a ground-plane pitch of the ground plane.

8. The computer of claim 7, wherein determining the orientation includes determining the vehicle yaw based on a direction from the first three-dimensional point to the second three-dimensional point.

9. The computer of claim 1, wherein determining the two-dimensional bounding box includes executing a neural network.

10. The computer of claim 1, wherein the ground plane is preset in the memory.

11. The computer of claim 1, wherein the instructions further include instructions to determine the ground plane based on range data received from a depth sensor.

12. The computer of claim 11, wherein the range data is generated by the depth sensor when the vehicle is absent.

13. The computer of claim 12, wherein determining the ground plane includes fitting a plane to the range data.

14. The computer of claim 1, wherein determining the first three-dimensional point and determining the second three-dimensional point are performed repeatedly, each repetition for one of a plurality of image frames.

15. The computer of claim 14, wherein determining the first three-dimensional point and determining the second three-dimensional point include minimizing an error across the repetitions.

16. The computer of claim 15, wherein the error includes a reprojection error between pixel coordinates of the first three-dimensional point and the second three-dimensional point and reprojections of the first three-dimensional point and the second three-dimensional point to pixel coordinates.

17. The computer of claim 14, wherein determining the first three-dimensional point and determining the second three-dimensional point include performing factor-graph optimization of the first three-dimensional point and the second three-dimensional point.

18. The computer of claim 14, wherein determining the second three-dimensional point includes identifying a landmark of the vehicle in a first of the image frames, determining the second three-dimensional point corresponding to the landmark, and tracking the landmark over the repetitions.

19. The computer of claim 18, wherein tracking the landmark over the repetitions is based on optical flow.

20. A method comprising:
    receiving an image frame from a camera, the image frame showing a vehicle;
    determining a two-dimensional bounding box around the vehicle in the image frame;

determining a first three-dimensional point that is an intersection between (a) a ray extending from the camera through a center of the two-dimensional bounding box and (b) a first plane that is parallel to a ground plane, the ground plane representing a surface on which the vehicle sits;

determining a second three-dimensional point on the vehicle; and determining an orientation of the vehicle based on the first three-dimensional point, the second three-dimensional point, and the ground plane.

* * * * *